(12) United States Patent
Wagner et al.

(10) Patent No.: US 12,265,781 B2
(45) Date of Patent: Apr. 1, 2025

(54) FACILITATING CONVERSION OF A PAGE DESCRIPTION LANGUAGE REPRESENTATION OF A CORRESPONDENCE TO AN ACCESSIBLE FORMAT

(71) Applicants: David Wagner, Boulder, CO (US); Scott Mastie, Boulder, CO (US)

(72) Inventors: David Wagner, Boulder, CO (US); Scott Mastie, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/182,181

(22) Filed: Mar. 10, 2023

(65) Prior Publication Data
US 2024/0303411 A1    Sep. 12, 2024

(51) Int. Cl.
*G06F 40/151*     (2020.01)
*G06F 3/0484*     (2022.01)
(Continued)

(52) U.S. Cl.
CPC .......... *G06F 40/151* (2020.01); *G06F 3/0484* (2013.01); *G06F 16/116* (2019.01);
(Continued)

(58) Field of Classification Search
CPC ...... G06F 40/40; G06F 40/103; G06F 40/151; G06F 40/143; G06F 40/186; G06F 16/116; G06F 3/0484
See application file for complete search history.

(56) References Cited

U.S. PATENT DOCUMENTS

| | | | | |
|---|---|---|---|---|
| 5,283,887 A | * | 2/1994 | Zachery | H04L 51/066 |
| | | | | 715/250 |
| 6,336,124 B1 | * | 1/2002 | Alam | G06F 40/151 |
| | | | | 715/205 |

(Continued)

FOREIGN PATENT DOCUMENTS

| | | |
|---|---|---|
| CN | 108415887 A | 8/2018 |
| EP | 2495667 A1 | 9/2012 |
| WO | 20170214073 A1 | 12/2017 |

OTHER PUBLICATIONS

AccessibilityNow, downloaded from https://crawfordtech.com/accessibilitynow/, Aug. 15, 2022, Crawford Technolgies, 14 pages.
(Continued)

*Primary Examiner* — Thu V Huynh
(74) *Attorney, Agent, or Firm* — Jaffery Watson Hamilton & DeSanctis LLP

(57) ABSTRACT

Systems and methods for facilitating conversion of a page description language (PDL) representation of a correspondence to an accessible format are provided. According to one embodiment, a correspondence is received in a form of an input file represented in a PDL. Text strings and corresponding coordinates indicative of points at which the text strings are positioned within a printable area of a page of the correspondence or an electronic equivalent thereof are extracted from the input file. Information is received indicative of multiple groups of the text strings. Each group is processed in accordance with an associated rule selected from multiple rules to create an output file in which the text strings within a given group of the plurality of groups are excluded or included within an element of the output file based on application of the associated rule to the given group.

20 Claims, 12 Drawing Sheets

(51) Int. Cl.
*G06F 16/11* (2019.01)
*G06F 40/103* (2020.01)
*G06F 40/143* (2020.01)
*G06F 40/186* (2020.01)
*G06F 40/40* (2020.01)

(52) U.S. Cl.
CPC .......... *G06F 40/103* (2020.01); *G06F 40/143* (2020.01); *G06F 40/186* (2020.01); *G06F 40/40* (2020.01)

(56) References Cited

U.S. PATENT DOCUMENTS

| | | | |
|---|---|---|---|
| 6,611,876 B1 | 8/2003 | Barrett et al. | |
| 2002/0129153 A1* | 9/2002 | Fleming | G06F 16/972 707/999.01 |
| 2002/0136222 A1* | 9/2002 | W. Robohm | H04M 3/42161 370/395.31 |
| 2002/0194227 A1* | 12/2002 | Day | G06F 40/143 715/234 |
| 2003/0043978 A1* | 3/2003 | Gallagher | H04M 3/4931 379/88.16 |
| 2003/0237046 A1* | 12/2003 | Parker | G06F 40/166 715/234 |
| 2004/0093355 A1* | 5/2004 | Stinger | G06F 40/177 |
| 2006/0112053 A1* | 5/2006 | Jeanblanc | G06N 5/02 706/46 |
| 2006/0288279 A1* | 12/2006 | Yacoub | G06V 10/987 707/E17.093 |
| 2011/0252315 A1 | 10/2011 | Misawa et al. | |
| 2012/0042236 A1* | 2/2012 | Adler, III | G06F 40/151 715/234 |
| 2013/0014007 A1* | 1/2013 | Kopp | G06F 40/103 715/243 |
| 2016/0132495 A1* | 5/2016 | Ghatage | G06F 40/12 707/756 |
| 2016/0140093 A1* | 5/2016 | Block | G06F 40/134 715/205 |
| 2020/0372202 A1* | 11/2020 | Hayslett | H04L 9/3247 |
| 2021/0271805 A1* | 9/2021 | Comeau | G06F 40/154 |
| 2021/0383106 A1* | 12/2021 | Maggio | G06F 18/2431 |
| 2023/0161946 A1* | 5/2023 | Bradley | G06F 16/22 715/205 |

OTHER PUBLICATIONS

What is AFP 2web?, downloaded from https://maas.de/afp2web/, Aug. 8, 2022, 3 pages.
AFP to Text Conversion Tool, https://www.timitoosystems.com/products/afp-conversion/afp-to-text.html, Timitoo Systems, Aug. 10, 2022, 2 pages.
AFP to HTML Converter, https://www.ipdsprinter.com/afp2html.html, Jul. 3, 2022, IPDS Printing Solutions Inc., 4 pages.
Papyrus Software—Getting Started and News General Information, https://docplayer.net/60848227-Papyrus-software-getting-started-and-news-general-information.html, Jul. 20, 2017, ISIS Papyrus, 250 pages, Relevant Text: ([8.17 Papyrus Postprocessing/Printpool and WebArchive AFP Splitter, p. 86]).
Adept Suite Fast, Accurate Document Transformation, https://www.palomaprintproducts.com/Content/files/PDF/ADEPT-Brochure.pdf, Jul. 2016, Paloma Print Products, 4 pages.
OpenText Output Transformation, https://www.opentext.com/file_source/OpenText/en_US/PDF/opentext-product-overview-analytics-opentext-output-tranformation-en.pdf, Aug. 2015, Opentext, 3 pages.
Target Stream Technologies, https://targetstream.com/, 2022, Target Stream Technologies, 5 pages.
Papyrus AFP Viewer Freeware, https://www.isis-papyrus.com/e15/pages/software/papyrus-server.html, May 2022, Papyrus, 115 pages.
Extended EP Search Report for Application No. 24162139.0, mailed Sep. 12, 2024, 8 pages.

* cited by examiner

FIG. 9

Region 922e

Text Rules
Delete Account Code 503a
Pages: 1-n
Rectangle: (3.310,0.060),2.450x0.350in
Action: Delete Text
Grouping Rules
Return Address 503b
Pages: 1
Rectangle: (0.820,0.880),3.340x1.060in
Action: Group Text into Lines
Mailing Address 903d
Pages: 1
Rectangle: (0.820,2.030),3.340x1.060in
Action: Group Text into Lines
Payment Info 903e
Pages: 1
Rectangle: (4.650,0.570),3.700x1.000in
Action: Group Text into Paragraphs
Default
Pages: 1-n Region 522a

B060000010000786598989

Your minimum amount due is $20.00, please make your checks payable to Fourteenth National Bank.

Form 2719
Notice date March 26, 2022
Client Number 7865989

Page 1 of 4

900

555

Region 522b

Fourteenth National Bank
123 Maple St.
Midville, CA 90010

Region 922d

John Q. Doe
9999 Oak Dr.
Anytown, USA 10010

Monthly Summary

Amount Due:   $20.00

FIG. 11

FACILITATING CONVERSION OF A PAGE DESCRIPTION LANGUAGE REPRESENTATION OF A CORRESPONDENCE TO AN ACCESSIBLE FORMAT

FIELD

Various embodiments of the present disclosure generally relate to providing a person with a disability (e.g., blindness and/or vision impairments) with a more accessible version of a correspondence. More particularly, embodiments relate to an automated approach for transforming a correspondence represented in the form of a page description language (PDL) into a form suitable for processing by an assistive technology device (e.g., an alternative media (AM) generation device, such as a screen reader or a Braille printer).

BACKGROUND

Various companies, organizations and government agencies continue to utilize legacy applications to send correspondence in print or electronic form to recipients via mail or electronic mail (email), respectively. The legacy applications may generate correspondence in the form of print jobs represented in the form of a PDL. For example, a number of such legacy applications continue to generate print jobs from the z/OS operating system, such as Advanced Function Presentation (AFP), Mixed Object: Document Content Architecture-Presentation (MO:DCA-P) data, Linemode data, mixed-mode data, and Metacode data. As such correspondence was generally intended for printing, the files containing the PDL typically include features or attributes (e.g., images, barcodes, table format lines, Optical Mark Recognition (OMR) characters, font information, text positioning information, legacy data to assist with printing or mailing) that are incompatible with and/or generally not useful for inclusion within an accessible version of the correspondence. Meanwhile, assistive technology devices (e.g., Braille printers and screen readers) generally consume text-based input files in common interchange file formats (e.g., text, comma-separated values (CSV), extensible markup language (XML), or hypertext markup language (HTML)). As such, there is a need for appropriate conversion technology as part of a process to make available accessible versions of correspondence to recipients with a disability (e.g., blindness and/or vision impairments).

SUMMARY

Systems and methods are described for facilitating conversion of a page description language (PDL) representation of a correspondence to an accessible format. According to one embodiment, a correspondence is received in a form of an input file represented in a page description language. Text strings and corresponding coordinates indicative of points at which the text strings are positioned within a printable area of a page of the correspondence or an electronic equivalent thereof are extracted from the input file. Information is received indicative of multiple groups of the text strings. Each group is processed in accordance with an associated rule selected from multiple rules to create an output file in which the text strings within a given group of the plurality of groups are excluded or included within an element of the output file based on application of the associated rule to the given group.

Other features of embodiments of the present disclosure will be apparent from accompanying drawings and detailed description that follows.

BRIEF DESCRIPTION OF THE DRAWINGS

In the following drawings like reference numbers are used to refer to like elements. Although the following figures depict various examples, one or more implementations are not limited to the examples depicted in the figures.

FIG. 9 is a screen shot illustrating multiple ordered rules and how an accessibility user can see and control groups of text for which rules have been defined via the GUI front end according to an embodiment of the present disclosure.

FIG. 11 is a screen shot illustrating HTML output of a conversion tool imported within a word processing application according to an embodiment of the present disclosure.

DETAILED DESCRIPTION

Figure 1:
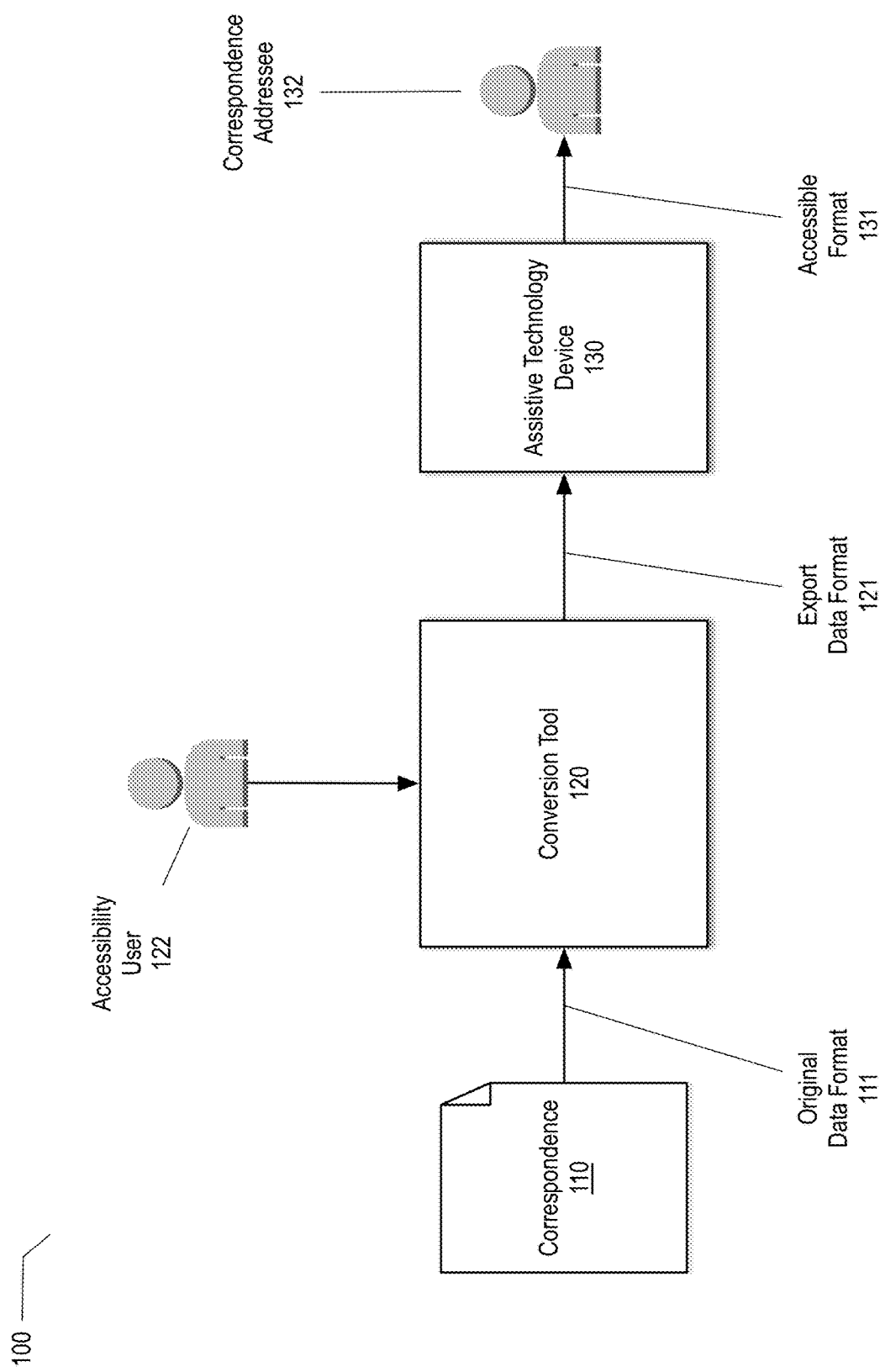
FIG. 1 is a context level diagram illustrating external actors that may interact with a conversion tool in accordance with an embodiment of the present disclosure.

Systems and methods are described for facilitating conversion of a page description language (PDL) representation of a correspondence to an accessible format. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

While in the context of various examples described herein the use of United States (US) English reading order conventions (e.g., top-to-bottom, left-to-right) and cartesian coordinates may be assumed, it is to be appreciated the methodologies described herein are applicable to other language reading order conventions and coordinate systems. Similarly, the methodologies described herein are not limited to any particular resolution (e.g., dots per inch (DPI)), font, or text color.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

As used herein a "correspondence" or "notice" generally refers to a document or form represented in the form of a page description language. A correspondence may include static documents or forms and/or those containing variable content, for example, that may change from one correspondence addressee to another or from one correspondence to another to the same correspondence addressee. The correspondence may be a communication (e.g., a monthly invoice or a statement) from a commercial entity (e.g., a wireless service provider, a bank, a credit card provider, a power company, a water company, etc.), an educational institution, a federal or state government agency (e.g., the United States Patent and Trademark Office (USPTO), the Census Bureau, the Department of Motor Vehicles, the United States Social Security Administration, the Department of Revenue, or the like), or other organization. A correspondence may be intended for printing and may potentially include contains images, barcodes, table format lines, Optical Mark Recognition (OMR) characters, font information, text positioning information, legacy data to assist with printing or mailing operations (e.g., human-readable-information (HRI)), and other features (e.g., portions identified for internal use), which are generally not useful for inclusion as part of an accessible version of the correspondence. To facilitate batch processing, correspondence may be identified by a correspondence type or a named document type, which may be included as part of the PDL, for example, in the form of a job name, z/OS attributes (e.g., class and form). Alternatively, an accessibility user may provide input to the conversion tool indicative of the correspondence type.

As used herein a "page description language" or "PDL" generally refers to a language that describes the appearance of a printed page at a higher level than an output bitmap. Non-limiting examples of PDLs include Advanced Function Presentation (AFP), Intelligent Printer Data Stream (IPDS), Mixed Object: Document Content Architecture-Presentation (MO:DCA-P), Printer Command Language (PCL), Portable Document Format (PDF), PostScript, Interpress, Xerox Escape Sequence (XES), and the like.

As used herein an "assistive technology device" generally refers to a piece of equipment, software program, or product system that is used to increase, maintain, or improve the functional capabilities of a person with a disability (e.g., a person that is blind or has other difficulty seeing). Non-limiting examples of an assistive technology device include a screen reader, a Braille printer, and a refreshable Braille display.

As used herein a "rule" generally refers a condition and a corresponding action to perform when the condition is satisfied. For example, the condition may include, but is not limited to, the page, text position, font, a match to a particular text pattern and the like. Non-limiting examples of actions include deletion of text associated with the rule and groping the text associated with the rule in a particular manner (e.g., as lines or as a paragraph).

Throughout this document, terms like "module," "engine," "program," and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 1 is a context level diagram illustrating external actors that may interact with a conversion tool 120 in accordance with an embodiment of the present disclosure. According to one embodiment, the conversion tool 120 is operable to facilitate conversion of a correspondence 110 represented in a first data format (e.g., original data format 111) to a second data format (e.g., an export data format 121) that is suitable for consumption by an assistive technology device 130 (e.g., a Braille printer or a screen reader) to produce an accessible format 131 (e.g., Braille, audio (speech), hybrid text, and/or large type) of the correspondence 110 for a recipient (e.g., correspondence addressee 132). For example, the first data format may be a PDL (e.g., AFP) (containing extraneous data and information) and the second data format may be a common interchange file format (e.g., text, comma-separated values (CSV), extensible markup language (XML), or hypertext markup language (HTML)) that may be input directly or indirectly (e.g., via an intermediate application) to the assistive technology device 130. For example, one particular non-limiting use case may involve importing a file output by the conversion tool 120 in the export data format 121 (e.g., HTML or another markup language) by or on behalf of the recipient into a word processing application (e.g., Microsoft Word), which can then be used to print directly to a Braille printer or export to a screen reader format of the file, thereby leveraging the text that is now normalized and structured for accessibility as described further below. In one embodiment, the export data format 121 for a screen reader is a PDF/Universal Accessibility (PDF/UA).

The flexible and modular nature of the conversion tool 120 described herein allows for various usage models and distribution of various tasks across multiple organizations. For example, depending on the particular implementation, one or more modules or programs making up the conversion tool 120 may be utilized during interactive creation of an accessible version of correspondence 110 or definition of rules for processing a class of correspondence (e.g., a correspondence type) by the accessibility user 122. A non-limiting example of such interactive operation is described below with reference to FIG. 2. Similarly, one or more of the modules or programs of the conversion tool 120 may be utilized by the same or a different organization to run automatically (e.g., in batch mode), for example, to generate a batch (e.g., hundreds or thousands) of production accessible documents having export data formats 121 in accordance with preferences specified by the respective recipients. A non-limiting example of such batch-mode operation is described below with reference to FIG. 3.

Figure 2:
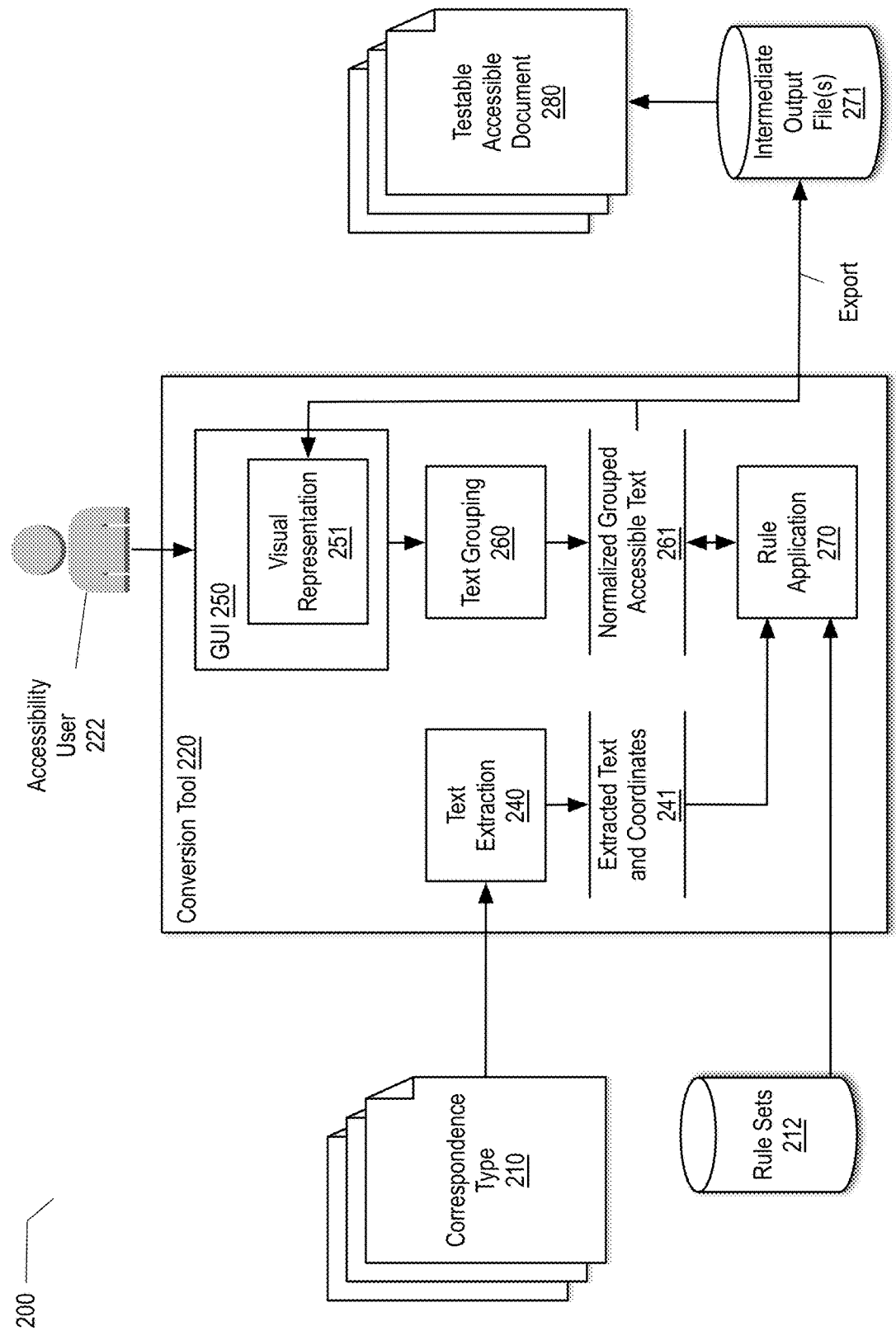
FIG. 2 is a block diagram illustrating functional units of a conversion tool that can be used interactively to create an accessible version of a correspondence according to an embodiment of the present disclosure.

FIG. 2 is a block diagram illustrating functional units of a conversion tool 220 that can be used interactively to create an accessible version of a correspondence 210 according to an embodiment of the present disclosure. In one embodiment, the conversion tool 220 (which may be analogous to conversion tool 120) may be used to facilitate generation of documents that meet the Americans with Disabilities Act (ADA), or ADA-compliant documents. In the context of the present example, the conversion tool 220 is shown including a graphical user interface (GUI) front end (e.g., GUI 250), a text extraction module or program (e.g., text extraction 240), a text grouping module or program (e.g., text grouping 260), and a rule application module or program (e.g., rule application 270).

As described and illustrated herein, the GUI front end may be used by an accessibility user 222 to interactively create a set of rules (e.g., rule sets 212) that may be used to process corresponding groups of text within the correspondence. For example, the rules may be used to (i) exclude legacy data that does not belong in an accessible version of the correspondence 210; (ii) include and define the flow, presentation order and/or interpretation of other text (e.g., as a table, a paragraph, and/or as individual lines); and (iii) add context in the form of titles and/or emphasis to grouped text, to provide appropriate accessibility aides to legacy application data not designed for accessibility. The GUI front end may also provide feedback to the accessibility user 222 regarding groups of text that have been defined within the correspondence and how the correspondence would appear if printed based on application of the currently specified rules.

The accessibility user 222 need not have any significant expertise in the underlying data format of the correspondence 210, but should generally have a working knowledge regarding accessibility. As noted above, the performance of various tasks via the conversion tool 220 may be distributed across multiple organizations. For example, the accessibility user 222, defining the rules for processing designated groups of text strings within the correspondence 210, may be employed by (or otherwise working on behalf of) a third-party service provider of the organization representing the sender or source of the correspondence or may be employed by (or otherwise working on behalf of) the sender. The rules may be stored by the accessibility user 222 to allow automated conversion of batches of documents having the same correspondence type by the same or a different organization.

Text extraction 240 may be responsible for extracting all of the text from a given correspondence and creating a data store (e.g., extracted text and coordinates 241). The data store may be an intermediate representation (e.g., a special file) containing a coordinate-based reference system (e.g., a cartesian coordinate system or other coordinate system) describing the positions of the extracted text. This data store may represent all of the pages of a piece of correspondence—and within each page, all of the planes, layers, and individual text lines and characters that can be scattered throughout the original correspondence 210. In one embodiment, for US English, precise cartesian coordinates may be identified for all text strings on a given page, and the text is preliminarily organized by default (unless overridden by a given rule) from top-to-bottom, left-to-right, regardless of the order in which the various text fields may have originally appeared in the PDL in which the correspondence 210 is represented.

When all the rules 212 have been applied by the rule application module 270 to respective groups of text with which they are associated, the results may be stored a data store (e.g., normalized and grouped accessible text 261). In one embodiment, the resulting text from the normalized and grouped accessible text 261 may be presented with the GUI front end as a visual equivalent (e.g., visual representation 251) that shows how the text would look, for example, if imported into a word processing application.

After potentially iterating through the rule definition process and evaluating the results via the visual representation 251, the accessibility user 222 may export the normalized grouped accessible text 261 to an intermediate output file within a set of intermediate output files 271. In one embodiment the format of the output file is HTML, which at this point is structured and ordered for accessibility. In turn, a given intermediate output file may then be used to create a testable accessible document 280, which represent is the type of final-form accessible document that the document recipient prefers to receive, for example, as obtained via the lightweight directory access protocol (LDAP) or other equivalent protocol. The finished accessible document of the testable accessible documents 280 may then be subjected to accessibility testing and additional iterative refinements to one or more of the defined text groupings and/or one or more of the rule sets 212 may be performed by the accessibility user 222 to refine the results.

According to one embodiment, one use case for presentation of an accessible version (e.g., testable accessible document 280) of the correspondence 210 is to import file the corresponding intermediate output file from intermediate output files 271 into a word processing application (e.g., Microsoft Word), which can then be used to print directly to a Braille printer or export to a screen reader format of the file, leveraging the text that is now normalized and structured for accessibility.

In some embodiments, additional information about each text string may be gathered including, among other things, tagged logical elements (TLEs) (e.g., comments), size of the page, information indicative of the font used for the text. Example use cases for font information include (i) a bar code can sometimes be printed in a specific font; bar codes are not usually interesting to the recipient, so such text can be deleted based on font regardless of coordinates; and (ii) a text string in a boldface font could be output with an HTML <em> tag to emphasize the text.

Figure 3:
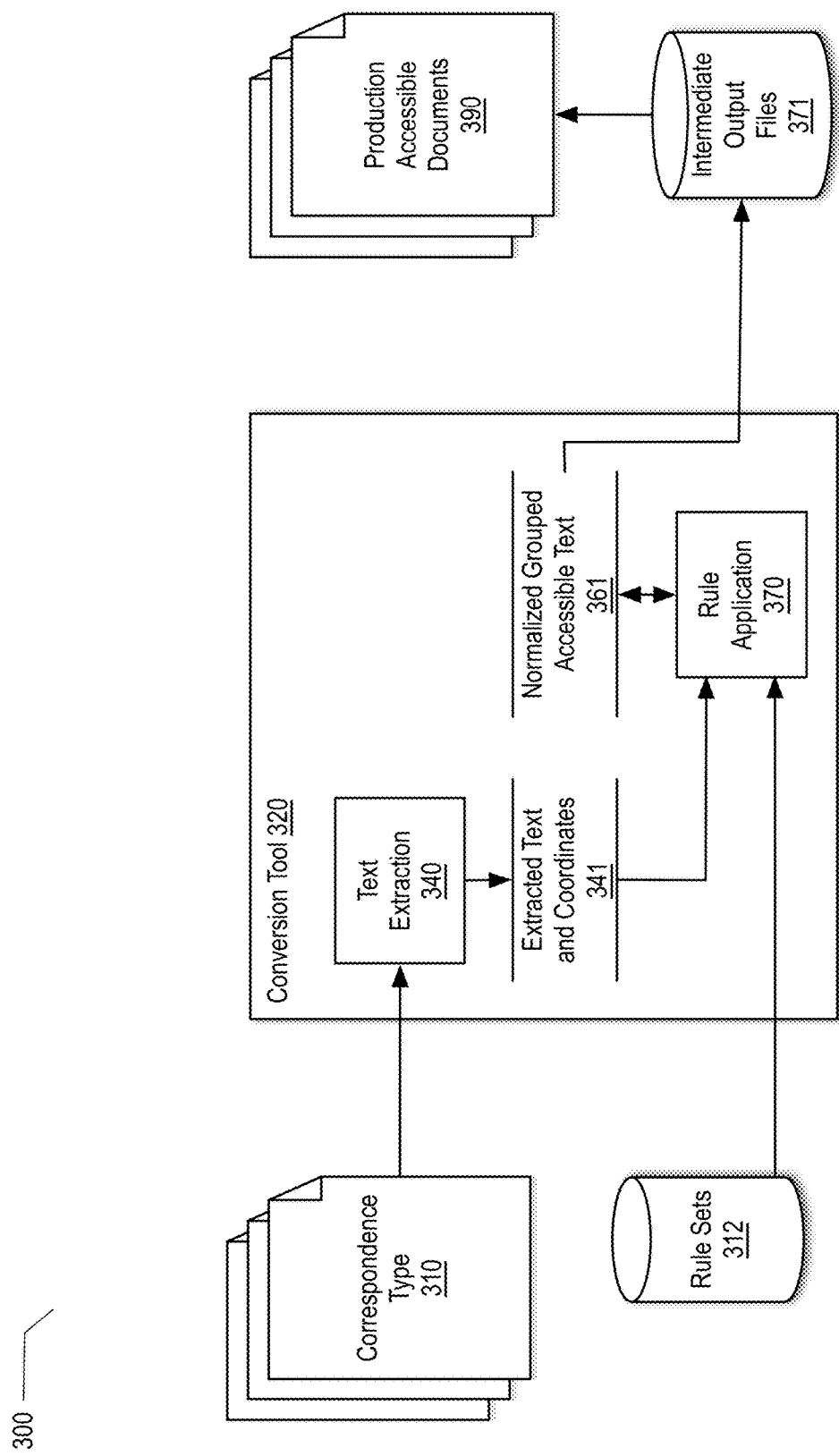
FIG. 3 is a block diagram illustrating functional units of a conversion tool that can be used in batch mode to create accessible versions of a batch of correspondence according to an embodiment of the present disclosure.

FIG. 3 is a block diagram illustrating functional units of a conversion tool 320 that can be used in batch mode to create accessible versions of a batch of correspondence having the same correspondence type 310 according to an embodiment of the present disclosure. Whereas the process described with reference to FIG. 2 may involve creation of an accessible version of a single correspondence by defining a set of rules, in other usage models the conversion tool 320 (which may be analogous to conversion tool 120 or 220) may also be run automatically in a batch mode, for example, in which the conversion tool 320 may accept as input a file or files containing multiple (potentially many thousands of) individual correspondence of a given correspondence type 310 directed to different recipients (e.g., correspondence addressee 132).

In the context of the present example, the conversion tool 320 is shown including a text extraction module or program (e.g., text extraction 340, which may be analogous to text extraction 240), a text grouping module or program (e.g., text grouping 360, which may be analogous to text grouping 260), and a rule application module or program (e.g., rule application 370, which may be analogous to rule application 270).

When a print job is received by text extraction 340 it may be identified to be of a particular correspondence type (e.g., a particular named type of document, for instance "LetterTypeXYZ" or "monthly statement.") There are many potential methods for this identification that will be apparent to those skilled in the art in the printing and mailing industry. For example, the job name or z/OS attributes (e.g., class and form) may be indicative of the correspondence type or the contexts of the first correspondence within the input file may be used to confirm the correspondence type for the batch at issue. In this example, the extraction of text strings and associated coordinates, for example, from all layers/planes of a given correspondence of the batch to create an extracted text and coordinates data store (e.g., extracted text and coordinates 341, which may be analogous to extracted text and coordinates 241) may be fully automated and run without any end user or GUI interaction. Similarly, in automated fashion, rule application 370 may then accesses a stored and named set of rules (e.g., rule sets 312, which may be analogous to rule sets 212) for this particular type of document. As a simple example, the set of rules might be stored in a control file named "LetterTypeXYZ" or "monthly statement" in this example—although any unique naming convention can be used. This then enables the conversion tool 320 to create corresponding normalized grouped accessible text 361 (which may be analogous to normalized grouped accessible text 261), a corresponding intermediate output file (e.g., an HTML file) within a set of intermediate output files 371 (which may be analogous to intermediate output files 271), and a corresponding production accessible document of production accessible documents 390 in a fully automated manner, for each individual piece of correspondence in the batch of original documents of the correspondence type 310 at issue.

As noted above, in one embodiment, LDAP may be used to retrieve information regarding a given recipient's preferred accessibility format so that the production accessible documents 390 represents a family of accessible output files each in an appropriate text-based output format for consumption by the recipient's preferred assistive technology device (e.g., assistive technology device 130). For example, a recipient of a first correspondence of the batch may have expressed a preference for large type, a recipient of a second correspondence of the batch may have specified a preference for a screen-reader formatted document, and a recipient of a third correspondence of the batch may wish to receive a file formatted for consumption by a Braille printer. According to one embodiment, in the automated, batch-processing context, each individual piece of correspondence may be automatically run through all of the steps—with the only variant being to confirm precisely which format of production accessible document the intended recipient prefers to receive. In other embodiments, it may be that the batch of a given correspondence type to be process represents a single type of (J) output. For example, the input print file representing the batch of correspondence to be converted to corresponding accessible versions may have already been grouped together based on the desired output format and therefore represents all of the correspondence for which a particular type of accessible document is to be generated by the conversion tool 320.

The various functional units (e.g., GUI 250, text extraction 240, text grouping 250, and rule application 270) described above with reference to FIGS. 2-3 and the processing described below with reference to the flow diagram of FIG. 4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., workstations, servers, personal computers, laptop computers, tablet computers, and smartphones), such as the computer system described with reference to FIG. 12 below.

Figure 4:
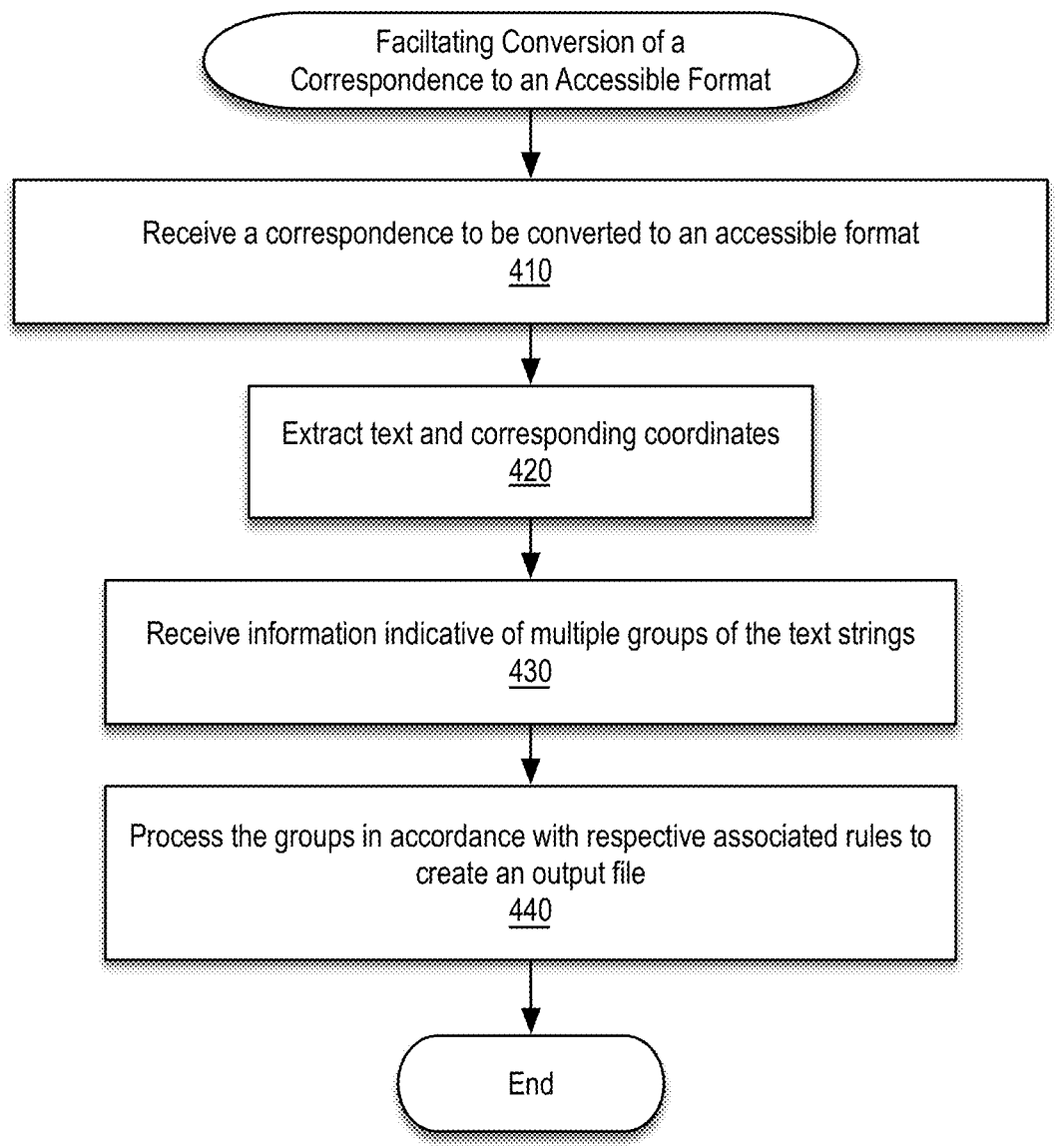
FIG. 4 is a flow diagram illustrating a set of operations for facilitating conversion of a correspondence to an accessible format in accordance with an embodiment of the present disclosure.

FIG. 4 is a flow diagram illustrating a set of operations for facilitating conversion of a correspondence to an accessible format in accordance with an embodiment of the present disclosure. According to one embodiment the processing described with reference to FIG. 4 is performed by a conversion tool (e.g., conversion tool 120, 220, or 320).

At block 410, a correspondence (e.g., correspondence 110, 210, or 310) that is to be converted to an accessible format is received by the conversion tool. The correspondence may be received in electronic form represented in a PDL alone or as part of a batch of correspondence of the same correspondence type to be processed based on a set of rules (e.g., rules 212 or 312) previously defined and stored by an accessibility user (e.g., accessibility user 222).

At block 420, text strings and corresponding coordinates are extracted from the correspondence. For example, a text extraction module or program (e.g., text extraction 240 or 340) may parse and analyze the PDL of the correspondence to identify individual text strings and their respective coordinates that are indicative of points at which the individual text strings are positioned within a printable area of a page of the correspondence or an electronic equivalent thereof. This extracted information may be persisted to a data store (e.g., extracted text and coordinates data store 241 or 341) and may be used to depict an original layout of the correspondence to the accessibility user, for example, via a GUI front end (e.g., GUI 250) when the conversion tool is being operated in an interactive mode.

At block 430, information indicative of multiple groups of the text strings are received by the conversion tool. For example, a text grouping module or program may receive coordinates indicative of a region within a coordinate space representing a printable area of a page of the correspondence or an electronic equivalent thereof containing text strings that are to be treated as a group. According to one embodiment and described further below, the groups of text stings may be specified by the accessibility user via the GUI front end by defining the region (e.g., by drawing a bounding box) within the depiction of the original layout that contains a group of text that are to be processed in accordance with a given rule of a set of rules (e.g., rule sets 212 or 312). Alternatively, the region (and hence the corresponding group of text strings contained therein) may be specified manually, for example, based on a set of multiple coordinates defining an enclosed space (e.g., a rectangle or other geometric shape).

At block 440, the groups of text are processed in accordance with respective associated rules to create an output file. For example, a rule application module or program (e.g., rule application 270 or 370) may generate normalized grouped accessible text (e.g., normalized grouped accessible text 261 or 361) from which an output file may be exported in accordance with preferences expressed by the intended recipient. Depending on the particular implementation, the preferences may be indicative of a preferred type of assistive technology device (e.g., assistive technology device 130) or a desired export data format suitable for direct or indirect consumption by a particular type of assistive technology device. In one embodiment, the conversion tool may export the normalized grouped accessible text to an output file in a particular export data format (e.g., export data format 121) represented in a common interchange file formats (e.g., text, CSV, XML, HTML, or similar text-based format). The output file may then be imported by or on behalf of the recipient to a word processing application (e.g., Microsoft Word), which can then be used to print directly to a Braille printer or export to a screen reader format of the file to convey/communicate the content of the correspondence to the recipient.

While in the context of the present example, a number of enumerated blocks are included, it is to be understood that examples may include additional blocks before, after, and/or in between the enumerated blocks. Similarly, in some examples, one or more of the enumerated blocks may be omitted and/or performed in a different order.

Figure 5:
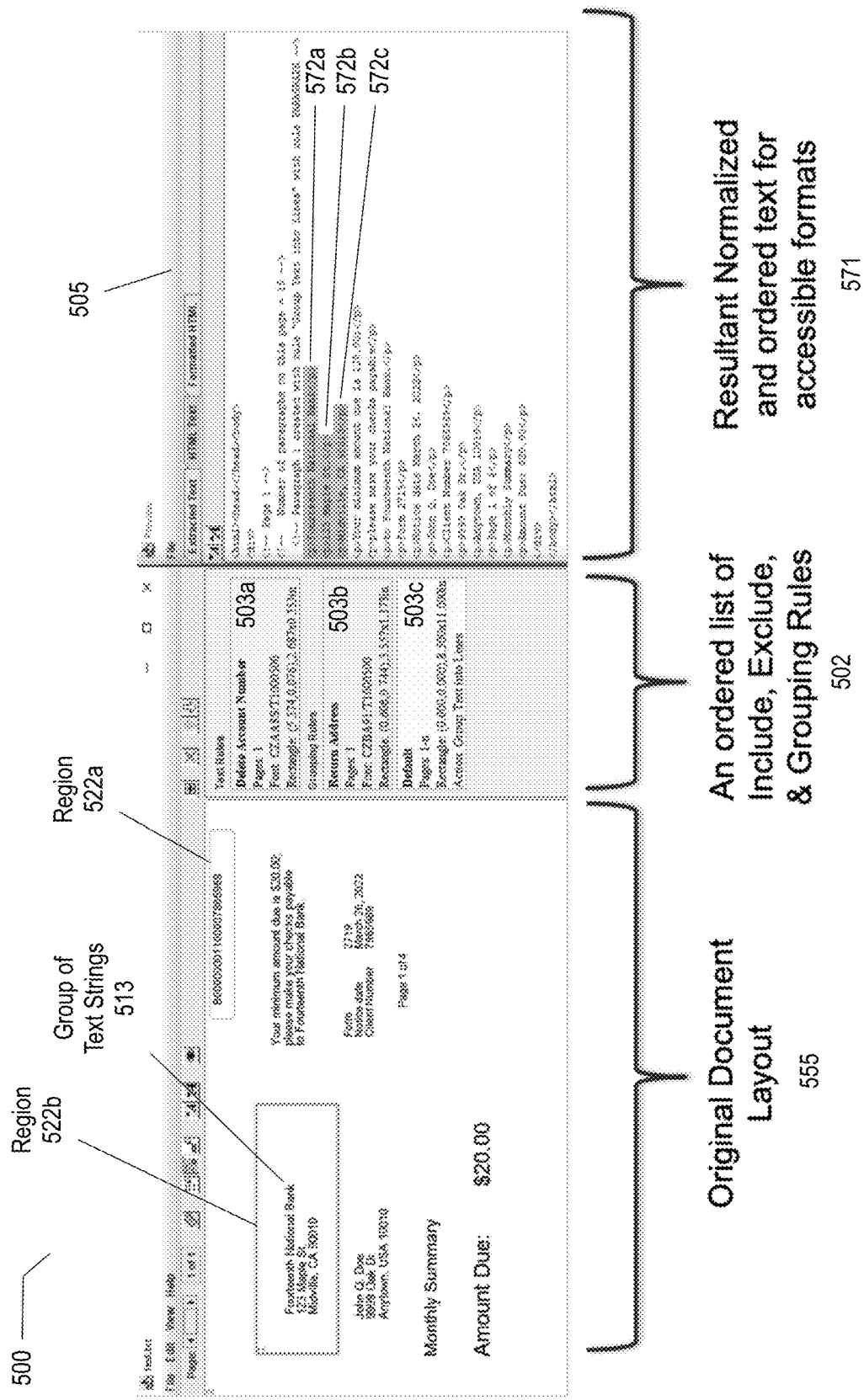
FIG. 5 illustrates an example screen shot from a graphical user interface (GUI) front end of a conversion tool in accordance with an embodiment of the present disclosure.

FIG. 5 illustrates an example screen shot 500 from by a graphical user interface (GUI) front end of a conversion tool in accordance with an embodiment of the present disclosure. The screen shot 500 may be representative of that which might be depicted by a GUI front end (e.g., GUI 250) at particular instant in time during operation of the conversion tool (e.g., conversion tool 120 or 220), for example, during which an accessibility user (e.g., accessibility user 122 or 222) is interacting with the conversion tool to create the rules (e.g., rule set 212 or 312), and iteratively adjust the rules, in order to create an accessible version of a given correspondence (e.g., correspondence 110) or correspondence type (e.g., correspondence type 210).

In the context of the present example, the screen shot 500 shows three panes (or portlets or other similar representations), including one pane displaying an original document layout 555, a second pane including an ordered list of rules 502, and a third pane 505 displaying resultant normalized and ordered text for accessible formats 571 (e.g., corresponding to normalized grouped accessible text 261 or 361) based on application of the current set of rules (e.g., rules 503a-c).

According to one embodiment, using a mouse or other equivalent pointing device, the accessibility user may identify a region 522b within the original document (e.g., a rectangle drawn around an address block) to define a group of text strings 513 that are to be processed in accordance with an associated rule (e.g., rule 503b). This allows the accessibility user to create the associated rule, in this case, that these individual lines of text should be kept together in the accessible document. That is, the text strings 513 within the region 522b are to be ordered top-to-bottom, left-to-right, separate and apart from (e.g., not merged with) the paragraph of text to the right of the region 522b. As will be apparent to those skilled in the art, in the absence of such a grouping via region 522b, the default behavior for a screen reader, for example, would be to simply read the text contained within the original document layout 555 from top-to-bottom and left-to-right, thereby intermingling blocks of text not intended to be read together. In this example, the accessibility user has also defined region 522a and a corresponding rule 503a (named "delete account number") to exclude the text string contained within region 522a from the resulting accessible document. Examples of various non-limiting types of text rules and group rules that may be defined for a text string or multiple text strings within a given region are described further below with reference to FIGS. 6, 7, and 9.

In the third pane 505, the text corresponding to the group of text strings 513 within region 522b is highlighted, showing the ordered and normalized result, ready to export. In this example, the group rule indicates each line of text with the group of text strings 513 is to be treated as an individual line resulting in each line being included within individual paragraph elements 572a-c within the resultant normalized and ordered text 571, which in this case is shown represented in HTML format.

Before discussing additional details regarding how various types of rules may be specified by an accessibility user (e.g., accessibility user 122 or 222) and how they may be applied by a conversion tool (e.g., conversion tool 120, 220, or 320), a high-level overview regarding various attributes of rules is first provided. According to one embodiment, rules (e.g., of rule sets 212 or 312) can include or exclude the one or more text strings contained within corresponding specified regions, for example, corresponding visual grouping regions (e.g., region 522a-b). In various examples shown and described herein, rules may be numbered 1-(N) to define the order in which the corresponding text string(s) should be used in the resultant accessible document. As an example, the first rule that identifies a group of one or more text strings to be included in the accessible document, would be the first text to be read aloud if a screen reader variant of the document is delivered to the intended recipient. A non-limiting example of explicit rule ordering is described further below with reference to FIG. 9.

Rules may be named for the benefit of the accessibility user, for example, to facilitate reuse within the same correspondence, the same correspondence type, and/or among different correspondence or different correspondence types that may share similar layout and/or content attributes (e.g., the positioning and/or use of text blocks that represent mailing addresses and the positioning and/or use of legacy data (e.g., HRI) or other artifacts (e.g., barcodes, images, etc.) that should generally not be part of an accessible version of a correspondence).

In addition to the name of a rule, that is not included within the final accessible version of a given correspondence, rules may separately have a title or other description that may appear in the final accessible document. For example, a block of text deemed to be of particular importance to the recipient by the accessibility user may be associated with a rule that includes a "header," which may call for separate treatment or emphasis in the accessible document. As another non-limiting example, a new rule created or selected from a set of predefined rules for the group of text strings associated with region 522b may include a heading or a title identifying the particular block of text as a return address.

In various examples described herein, rules may apply to all pages of a correspondence, or any desired subset of pages (e.g., pages X-Y, even pages, odd pages, or pages X-Y and N-M) within the correspondence. Rules may also span pages, for example, to logically group text that may flow from one page onto another.

Rules can preserve line breaks. For instance, a group rule (e.g., "Group Text into Lines") may cause text strings having a same Y-coordinate within a corresponding group of text to be treated as part of an individual line of text by during the transformation including each of the text strings having the same Y-coordinate within the same HTML paragraph element (<p>) as shown in FIG. 5 in which each line of a mailing address is included within a separate HTML paragraph element (e.g., paragraph elements 572a-c). Alternatively, a rule can group lines into the same paragraph. For instance, a group rule (e.g., "Group Text into Paragraphs") may cause all text strings within a corresponding group of text to be included within a single paragraph element, an example of which is shown in FIG. 9 below.

According to one embodiment, a set of rules defined for a particular correspondence or for a correspondence type can be saved as a template or a control file, for example, by the accessibility user selecting a "Write control file" option from the "File" drop-down menu (not shown). In this manner, the stored template or control file generated and tested by the accessibility user, for example, during an interactive process, such as that described with reference to FIG. 2, can subsequently be used for batch processing, for example, as described with reference to FIG. 3.

Figure 6:
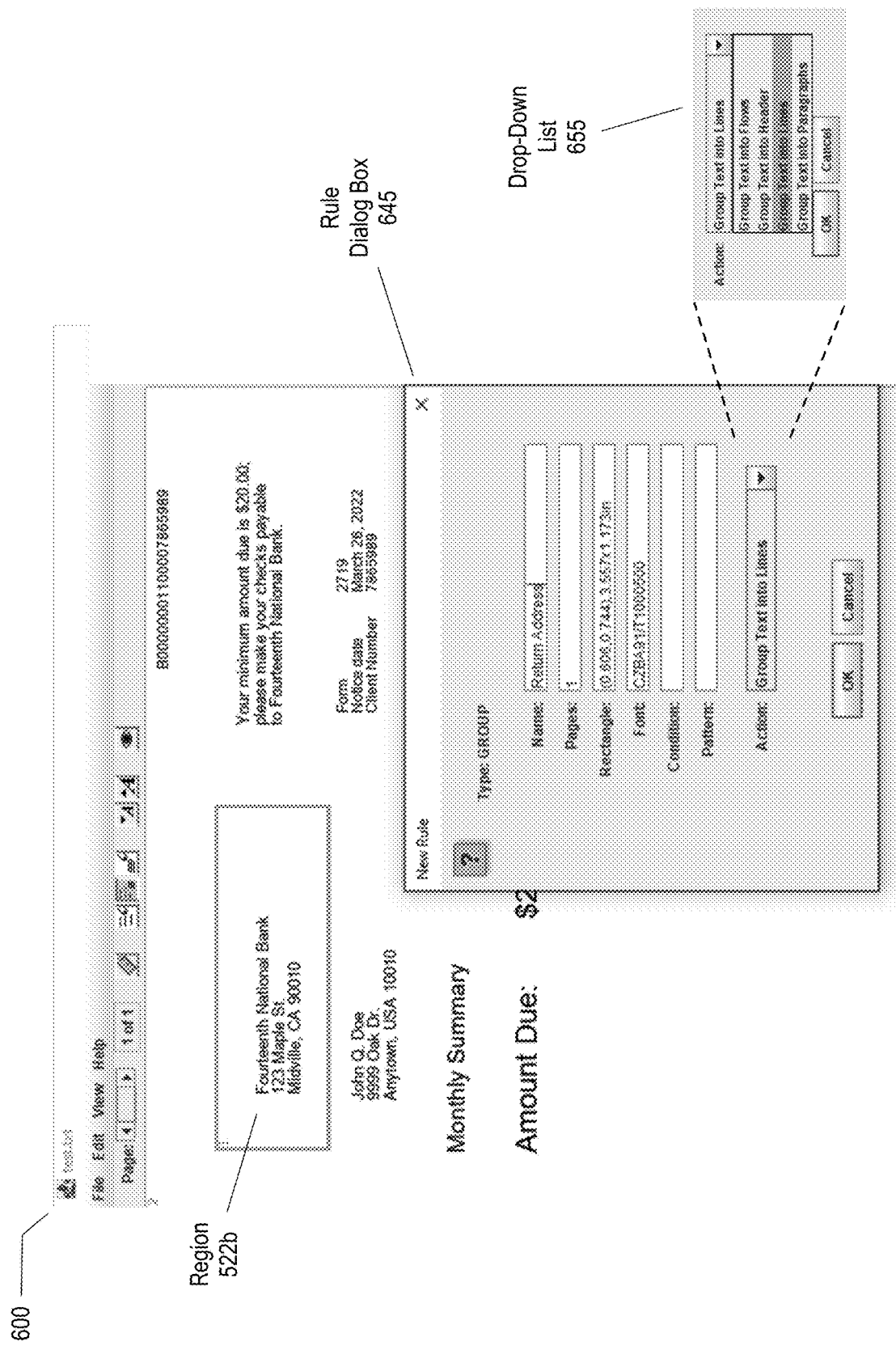
FIG. 6 is a screen shot illustrating creation of a group rule via the GUI front end according to an embodiment of the present disclosure.

FIG. 6 is a screen shot 600 illustrating creation of a group rule via the GUI front end (e.g., GUI 250) according to an embodiment of the present disclosure. In the context of the present example, a group rule named "Return Address" is being defined for the group of text within region 522b via a rule dialog box 645. According to one embodiment, the rule dialog box 645 may represent a pop-up screen triggered by an accessibility user (e.g., accessibility user 122 or 222) drawing the rectangular bounding box representing region 522b for the first time or subsequently selecting the previously defined region 522b.

As noted above, rules can apply to all pages in a correspondence, or any desired subset of pages within the correspondence. In this example, the "Return Address" rule is limited to page-1 because the return address information only appears on page-1 of each correspondence, for this type of correspondence.

In this example, an explicit pull-down (e.g., drop-down list 655) presents four different options from which the accessibility user may select to specify how the corresponding group of text associated with region 522b should be processed (e.g., included within) in the accessible version of the correspondence at issue.

As noted above, grouping text within a "Flow" is a common desire, for example, in connection with conjoin different blocks of text into a single unit, such as when a paragraph may flow from one page onto another. Grouping text within a header is a way to add emphasis or a title to the accessible document. Grouping text into lines, identifies that the region on the page contains multiple lines, which should be preserved as separate lines in the accessible text. As illustrated by various examples herein, this is common for address blocks including the intended recipient and the return address and preserves line breaks in the accessible text version of the document. Grouping text into paragraphs in contrast to grouping text into lines does away with line breaks, and is useful when the region contains a single thought or sentence that belongs together. An example use case for grouping text into paragraphs is shown in FIG. 9 with respect to the group of text strings within region 922e, which is spread across 3 lines in this region.

Figure 7:
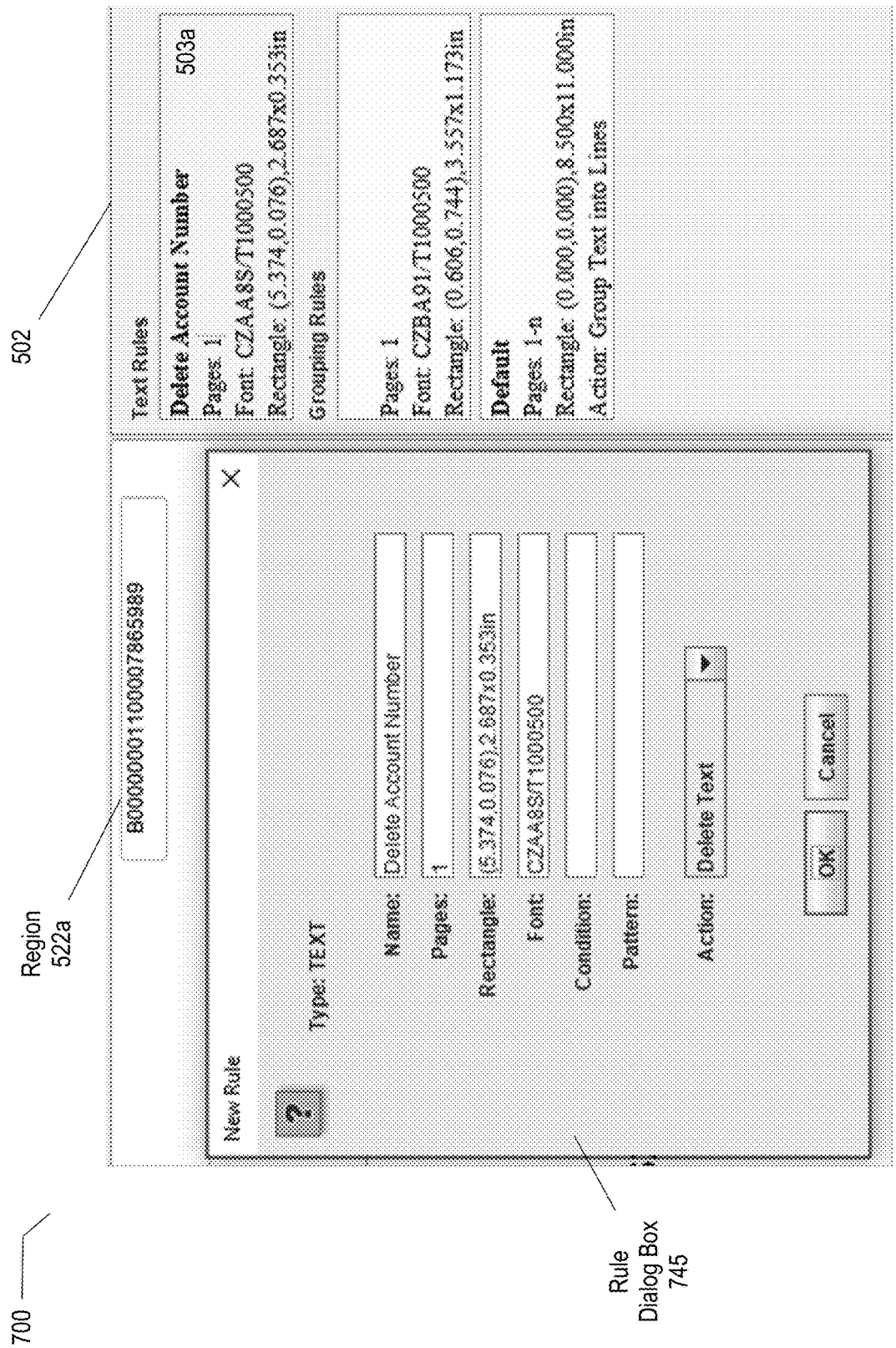
FIG. 7 is a screen shot illustrating creation of a text exclusion rule via the GUI front end according to an embodiment of the present disclosure.

FIG. 7 is a screen shot 700 illustrating creation of a text exclusion rule via the GUI front end (e.g., GUI 250) according to an embodiment of the present disclosure. As noted above, rules can be set up to exclude text. Exclusion is helpful in various scenarios because some pages of a correspondence may include legacy data, for example, that is placed on the page to assist with printing or mailing operations, but which does not belong in an accessible version of the correspondence. For example, in FIG. 7, a string of digits at the top of the page (representing (HRI) for mailing operations) within region 522a, and should be excluded from an accessible version of this sample correspondence. Other text for which an accessibility user (e.g., accessibility user 122 or 222) may wish to define exclusion rules include OMR characters, barcodes, images, etc.

In the context of the present example, a text rule named "Delete Account Number" is being defined for the text string within region 522a via a rule dialog box 745. As above, the rule dialog box 745 may represent a pop-up screen triggered by the accessibility user drawing the rectangular bounding box representing region 522a for the first time or subsequently selecting the previously defined region 522a.

In this example, the "Delete Account Number" rule is limited to page-1 because these extraneous digits only appear on page-1 of each correspondence, for this type of correspondence.

Figure 8:
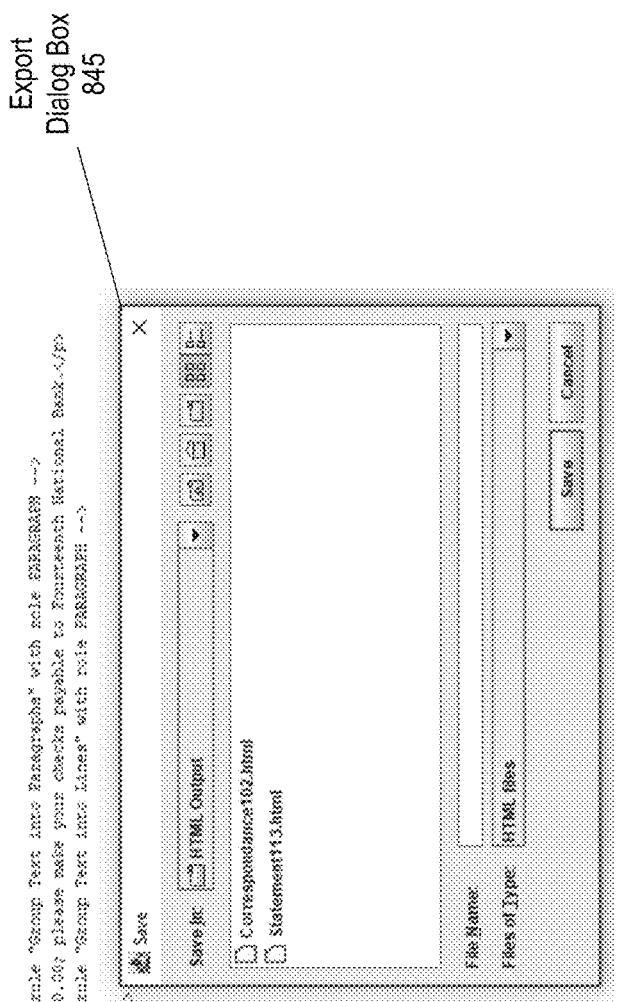
FIG. 8 is a screen shot illustrating exporting of a text-based output of a conversion tool to a file via the GUI front end according to an embodiment of the present disclosure.

FIG. 8 is a screen shot 800 illustrating exporting of a text-based output of a conversion tool to a file via the GUI front end (e.g., GUI 250) according to an embodiment of the present disclosure. In the context of the present example, an export dialog box 845 is displayed to an accessibility user (e.g., accessibility user 122 or 222), for example, responsive to the accessibility user selecting an export option from the "File" drop-down menu (not shown).

In one embodiment, this allows the accessibility user to export the resultant normalized and ordered text 571 (e.g., in HTML format), for example, generated based on application of the set of rules (e.g., rule sets 212 or 312) to corresponding groups of one or more text strings (e.g., 522a-b) to a file format (e.g., HTML) that may be suitable for input directly or indirectly (e.g., via an intermediate application) to an assistive technology device (e.g., assistive technology device 130).

FIG. 9 is a screen shot 900 illustrating multiple ordered rules (e.g., rules 503a-b and 903d-e) and how an accessibility user can see and control groups of text for which rules have been defined via the GUI front end (e.g., GUI 250) according to an embodiment of the present disclosure.

As noted earlier, rules may be explicitly ordered, and the ordering may correspond to the text ordering that is desired in the accessible document. As an example, screen shot 900 illustrates a scenario in which the rules associated with a sender return address block (defined by region 522b) and a recipient mailing address block (defined by region 922b) despite both being lower in the Y-coordinate space than a block of text identifying a minimum payment due and the payee (defined by region 922e) are applied prior to a rule associated with the text group of region 922e, thereby including the text of the address two blocks within the accessible version of the document prior to the block of text identifying the minimum payment due and the payee.

While not shown in FIG. 9, it is to be appreciate the same ordering technique used in connection with groups of one or more text strings can be applied to images as well. For example, a region may be defined around an image within a given correspondence, and then may be replaced with accessible text, for example, in an extracted text and coordinates data store (e.g., extracted text and coordinates 241 or 341), in a normalized grouped accessible text data store (e.g., normalized grouped accessible text 261 or 361), the visible equivalent, a file in the exported data format (e.g., HTML), the corresponding testable accessible document (e.g., within testable accessible documents 280), and the corresponding production accessible document (e.g., within production accessible documents 390) via the addition of an appropriate descriptive text in lieu of the image. Thus, the image is not included, but summary text (e.g., "An image of a soaring eagle appears at the top of the page" or other appropriate description) may be added to the accessible document by an accessibility user (e.g., accessibility user 122 or 222) such as According to one embodiment, the accessibility user may drag-and-drop rules or otherwise promote or demote rules by interacting with the middle pane of FIG. 5, which is shown on the right-hand side of FIG. 9, for example, to reorder the processing of various groups of text strings.

Also, shown in FIG. 9 are examples of text rules and grouping rules being specified for a single page and a range of pages (e.g., 1-n).

According to one embodiment, the GUI front end may facilitate verification by the accessibility user whether all text within a given correspondence (that is desired to be processed for purposes of improving accessibility) has an associated rule, for example, by displaying all defined regions. In this manner, the accessibility user can determine whether any text not within a defined region should be.

Figure 10:
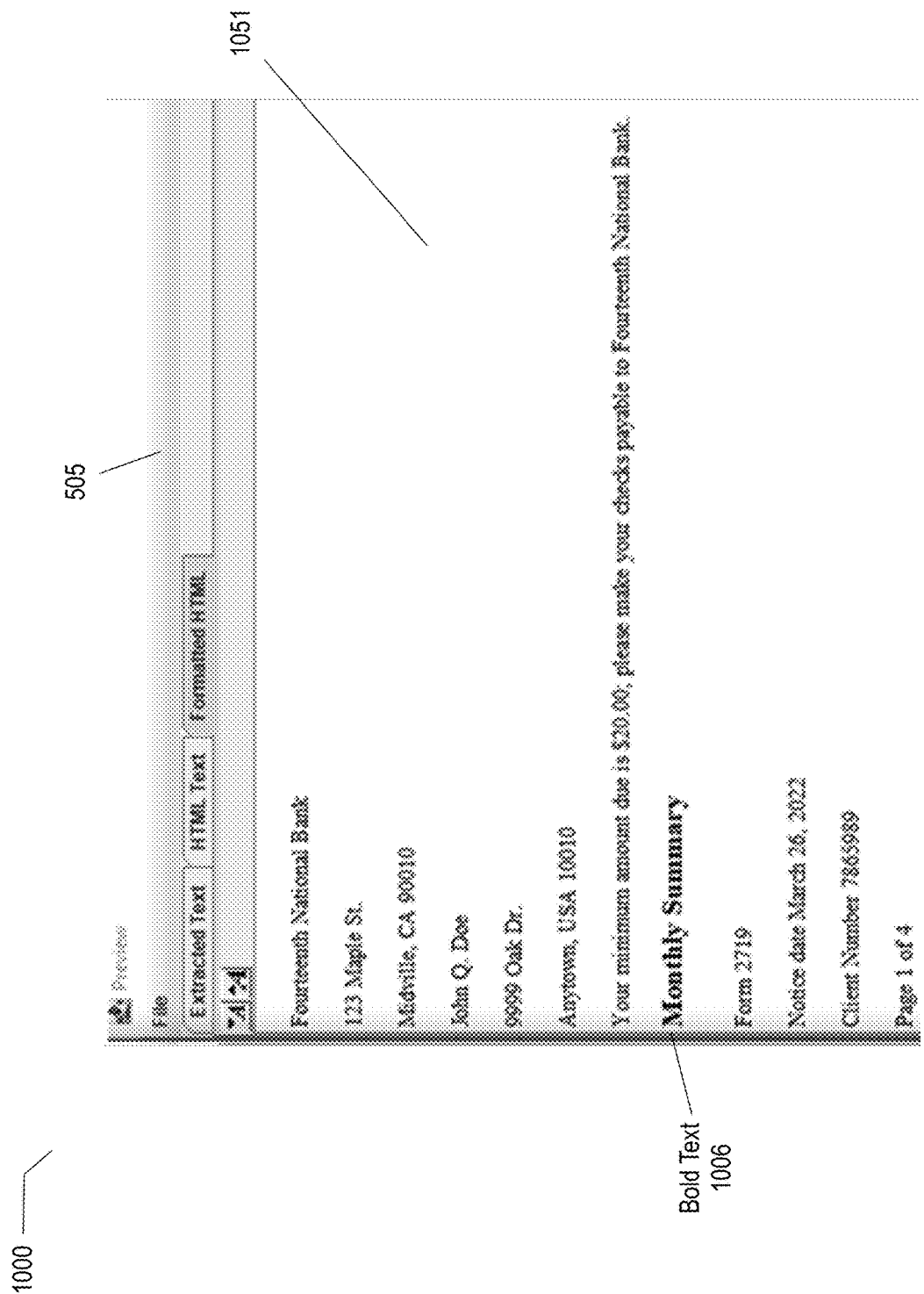
FIG. 10 is a screen shot illustrating text extracted from a correspondence and transformed by a conversion tool to Hypertext Markup Language (HTML) according to an embodiment of the present disclosure.

FIG. 10 is a screen shot 1000 illustrating text extracted from a correspondence and transformed by a conversion tool (e.g., conversion tool 120, 220, or 320) to Hypertext Markup Language (HTML) according to an embodiment of the present disclosure. In the context of the present example, the formatted HTML 1051 (which may be analogous to visual representation 251) generally corresponds to the HTML text shown in FIG. 8 with the exception of the text string "Monthly Summary" being presented in bold text 1006 in this example.

Figure 11:
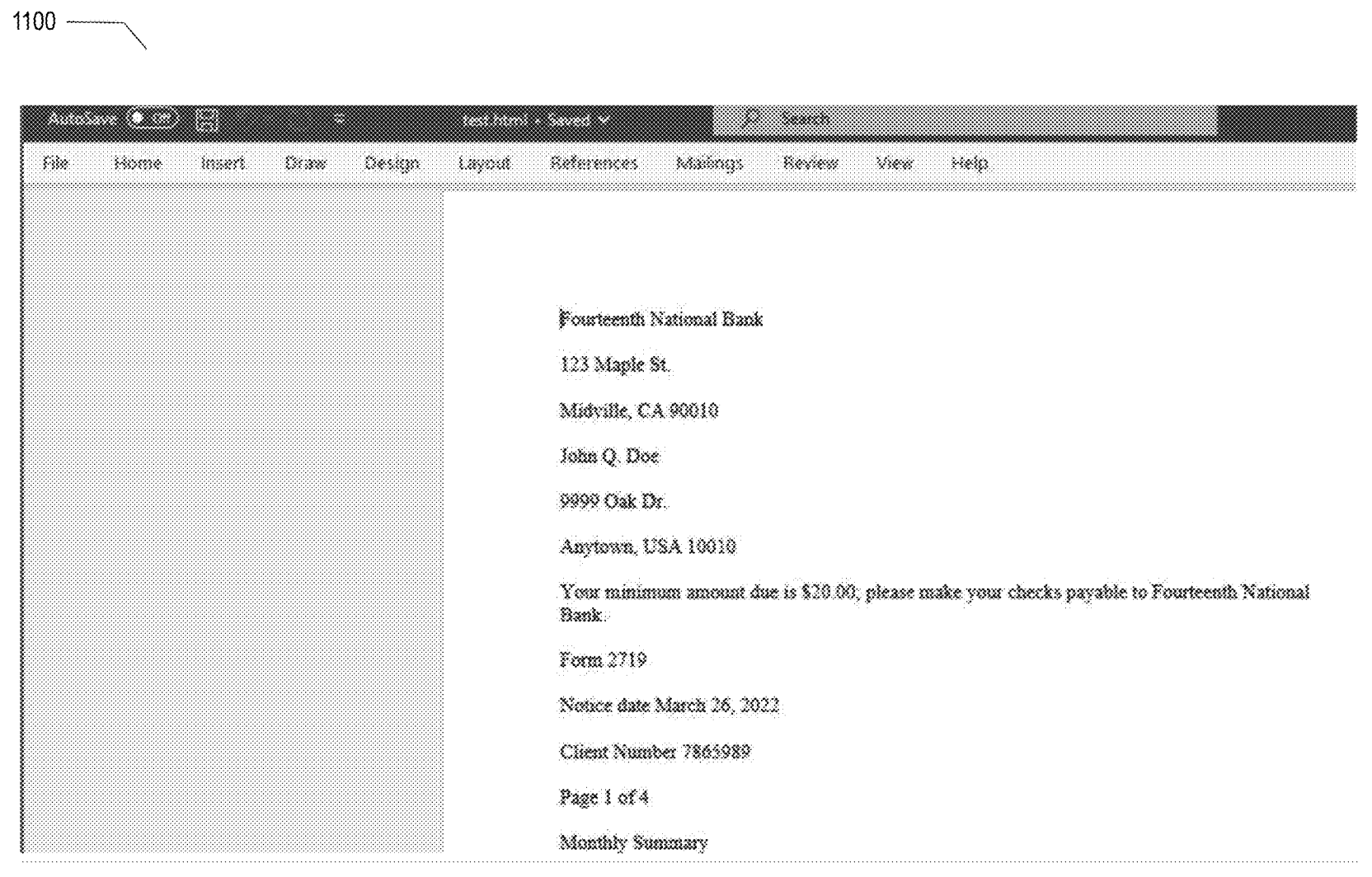

FIG. 11 is a screen shot 1100 illustrating HTML output of a conversion tool (e.g., conversion tool 120, 220, or 320) imported within a word processing application according to an embodiment of the present disclosure. This example is provided simply to show, the HTML output of the conversion tool, for example, the exported HTML file representing the resultant normalized and ordered text 571 described with reference to FIG. 8 may be imported by a word processing application (e.g., Microsoft Word). In various use cases, the word processing application may be used as an intermediate application to further interface with an assistive technology device (e.g., assistive technology device 130), for example, by printing to a Braille printer or by exporting a file output by the conversion tool to a screen reader format of the file.

Figure 12:
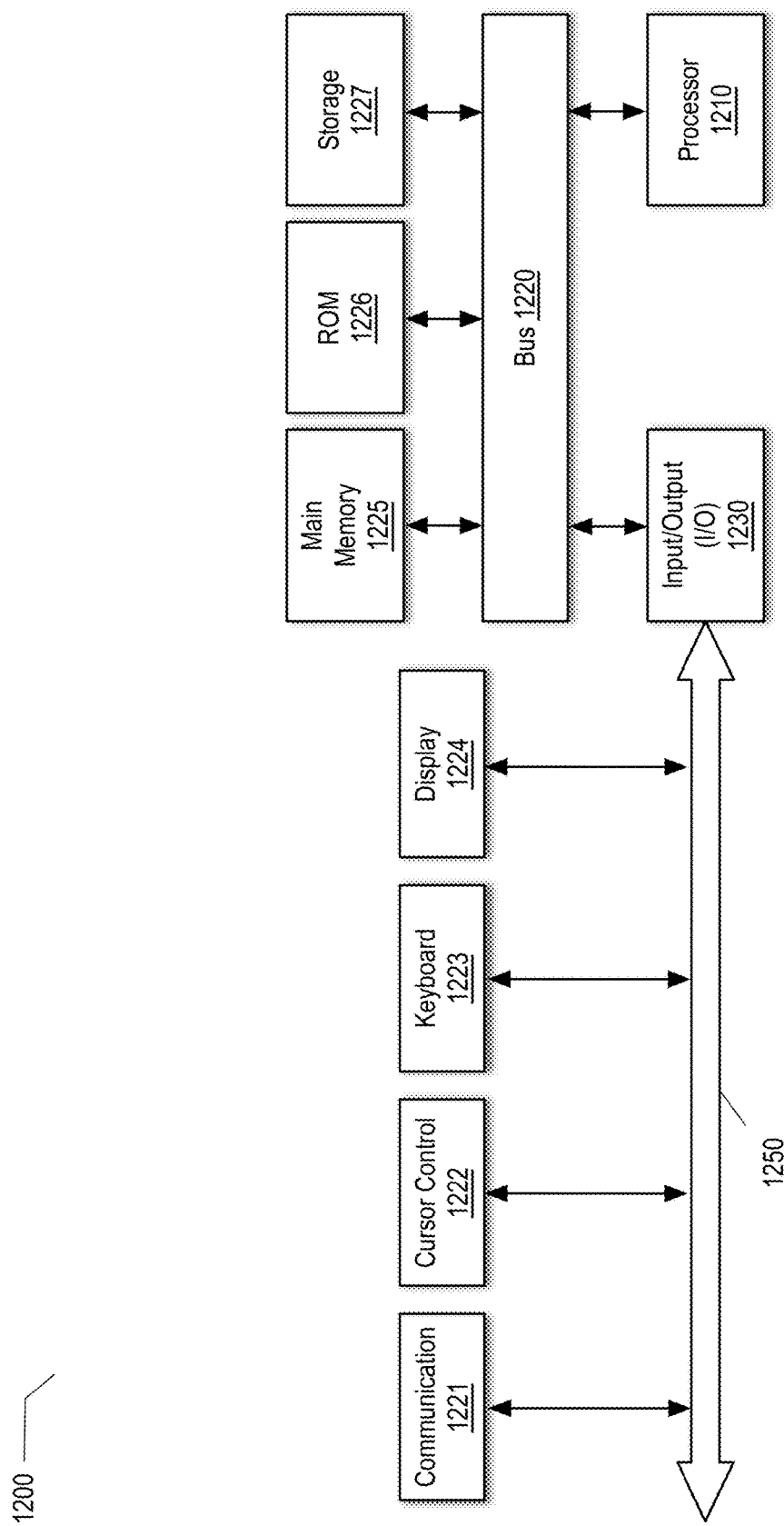
FIG. 12 is a block diagram illustrating a computing device suitable for implementing embodiments of the present disclosure.

FIG. 12 is a block diagram illustrating a computer system 1200 suitable for implementing embodiments of the present disclosure. In the context of the present example, computer system 1200 includes a system bus 1220 for communicating information, and a processor 1210 coupled to bus 1220 for processing information.

Computer system 1200 further comprises a random-access memory (RAM) or other dynamic storage device 1225 (referred to herein as main memory), coupled to bus 1220 for storing information and instructions to be executed by processor 1210. Main memory 1225 also may be used for storing temporary variables or other intermediate information during execution of instructions by processor 1210. Computer system 1200 also may include a read only memory (ROM) and or other static storage device 1226 coupled to bus 1220 for storing static information and instructions used by processor 1210.

A data storage device 1227 such as a magnetic disk or optical disc and its corresponding drive may also be coupled to computer system 1200 for storing information and instructions. Computer system 1200 can also be coupled to a second I/O bus 1250 via an I/O interface 1230. A plurality of I/O devices may be coupled to I/O bus 1250, including a display device 1224, an input device (e.g., a keyboard (or alphanumeric input device) 1223 and or a cursor control device 1222). The communication device 1221 is for accessing other computers (servers or clients). The communication device 1221 may comprise a modem, a network interface card, or other well-known interface device, such as those used for coupling to Ethernet, token ring, or other types of networks.

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
   receiving a correspondence in a form of an input file represented in a page description language (PDL);
   identifying a correspondence type of the correspondence from among a plurality of correspondence types;
   extracting, from the input file, text strings and corresponding coordinates indicative of points at which the text strings are positioned within a printable area of a page of the correspondence or an electronic equivalent thereof;

receiving information indicative of a plurality of groups of the text strings from a previously created template associated with the correspondence type, wherein each group of the plurality of groups has been specified by an accessibility user with reference to an original layout of another correspondence of the correspondence type while depicted within a graphical user interface by defining a corresponding region within the original layout containing the group; and facilitating conversion of the input file to an accessible format by processing each group of the plurality of groups in accordance with an associated rule selected by the accessibility user from a plurality of rules and stored within the previously created template to create an output file in which the text strings within a given group of the plurality of groups are excluded or included within an element of the output file based on application of the associated rule to the given group.

2. The method of claim 1, wherein the output file comprises a hypertext markup language (HTML) file.

3. The method of claim 1, further comprising causing the output file to be consumed by an assistive technology device directly or indirectly via import to a word processing application.

4. The method of claim 1, wherein a first rule of the plurality of rules causes all text strings within a particular group of the plurality of groups with which the first rule is associated to be treated as part of a single paragraph.

5. The method of claim 1, wherein a second rule of the plurality of rules causes text strings having a same Y-coordinate within a particular group of the plurality of groups with which the second rule is associated to be treated as part of an individual line of text.

6. The method of claim 1, wherein a third rule of the plurality of rules causes those of the text strings within a particular group of the plurality of groups with which the third rule is associated to be excluded from the output file.

7. The method of claim 1, wherein a fourth rule of the plurality of rules causes text strings within a particular group of the plurality of groups with which the fourth rule is associated to be identified as being part of a table.

8. The method of claim 1, wherein the graphical user interface comprises a what you see is what you get (WYSIWYG) user interface and wherein the template was created via interactions with the WYSIWYG user interface presenting an image of one or more pages of said another correspondence.

9. The method of claim 8, wherein the interactions include:
identifying a region within the WYSIWYG user interface to define a group of the plurality of groups; and
selecting the rule for the group from a plurality of predefined rules.

10. The method of claim 1, wherein the page description language comprises Advanced Function Presentation (AFP) or Portable Document Format (PDF).

11. The method of claim 1, wherein the correspondence is part of a batch of correspondence to be automatically converted in batch mode to a batch of production accessible documents in accordance with preferences specified by respective recipients.

12. The method of claim 11, further comprising:
determining a preferred accessible document format for a given recipient of the respective recipients via lightweight directory access protocol (LDAP); and
creating the output file for the given recipient based on the preferred accessible document format.

13. A computer-readable medium having stored thereon instructions that, when executed by one or more processors, cause the one or more processors to:
receive a correspondence in a form of an input file represented in a page description language (PDL);
identify a correspondence type of the correspondence from among a plurality of correspondence types;
extract, from the input file, text strings and corresponding coordinates indicative of points at which the text strings are positioned within a printable area of a page of the correspondence or an electronic equivalent thereof;
receive information indicative of a plurality of groups of the text strings from a previously created template associated with the correspondence type, wherein each group of the plurality of groups has been specified by an accessibility user with reference to an original layout of another correspondence of the correspondence type while depicted within a graphical user interface by defining a corresponding region within the original layout containing the group; and
facilitate conversion of the input file to an accessible format by processing each group of the plurality of groups in accordance with an associated rule selected by the accessibility user from a plurality of rules and stored within the previously created template to create an output file in which the text strings within a given group of the plurality of groups are excluded or included within an element of the output file based on application of the associated rule to the given group.

14. The computer-readable medium of claim 13, wherein the output file comprises a hypertext markup language (HTML) file.

15. The computer-readable medium of claim 13, wherein:
a first rule of the plurality of rules causes all text strings within a particular group of the plurality of groups with which the first rule is associated to be treated as part of a single paragraph;
a second rule of the plurality of rules causes text strings having a same Y-coordinate within a particular group of the plurality of groups with which the second rule is associated to be treated as part of an individual line of text; and
a third rule of the plurality of rules causes those of the text strings within a particular group of the plurality of groups with which the third rule is associated to be excluded from the output file.

16. The computer-readable medium of claim 13, wherein the correspondence is part of a batch of correspondence to be automatically converted in batch mode to a batch of production accessible documents in accordance with preferences specified by respective recipients and wherein the instructions further cause the system to:
determine a preferred accessible document format for a given recipient of the respective recipients via a directory access protocol; and
create the output file for the given recipient based on the preferred accessible document format.

17. A system comprising:
one or more processors; and
instructions, which when executed by the one or more processors cause the system to:

receive a correspondence in a form of an input file represented in a page description language (PDL);

identify a correspondence type of the correspondence from among a plurality of correspondence types;

extract, from the input file, text strings and corresponding coordinates indicative of points at which the text strings are positioned within a printable area of a page of the correspondence or an electronic equivalent thereof;

receive information indicative of a plurality of groups of the text strings from a previously created template associated with the correspondence type, wherein each group of the plurality of groups has been specified by an accessibility user with reference to an original layout of another correspondence of the correspondence type while depicted within a graphical user interface by defining a corresponding region within the original layout containing the group; and facilitate conversion of the input file to an accessible format by processing each group of the plurality of groups in accordance with an associated rule selected by the accessibility user from a plurality of rules and stored within the previously created template to create an output file in which the text strings within a given group of the plurality of groups are excluded or included within an element of the output file based on application of the associated rule to the given group.

18. The system of claim 17, wherein the output file comprises a hypertext markup language (HTML) file.

19. The system of claim 17, wherein:
   a first rule of the plurality of rules causes all text strings within a particular group of the plurality of groups with which the first rule is associated to be treated as part of a single paragraph;
   a second rule of the plurality of rules causes text strings having a same Y-coordinate within a particular group of the plurality of groups with which the second rule is associated to be treated as part of an individual line of text; and
   a third rule of the plurality of rules causes those of the text strings within a particular group of the plurality of groups with which the third rule is associated to be excluded from the output file.

20. The system of claim 17, wherein the correspondence is part of a batch of correspondence to be automatically converted in batch mode to a batch of production accessible documents in accordance with preferences specified by respective recipients and wherein the instructions further cause the system to:
   determine a preferred accessible document format for a given recipient of the respective recipients via a directory access protocol; and
   create the output file for the given recipient based on the preferred accessible document format.

\* \* \* \* \*